United States Patent
Nakao (10) Patent No.: US 8,737,377 B2
(45) Date of Patent: May 27, 2014

(54) RADIO APPARATUS

(75) Inventor: Seigo Nakao, Gifu (JP)

(73) Assignee: Hera Wireless S.A., Luxembourg (LU)

( * ) Notice: Subject to any disclaimer, the term of this patent is extended or adjusted under 35 U.S.C. 154(b) by 1228 days.

(21) Appl. No.: 11/477,429

(22) Filed: Jun. 30, 2006

(65) Prior Publication Data

US 2007/0021075 A1  Jan. 25, 2007

Related U.S. Application Data

(60) Provisional application No. 60/694,987, filed on Jun. 30, 2005.

(51) Int. Cl.
| | | |
|---|---|---|
| *H04L 5/04* | (2006.01) | |
| *H04B 7/204* | (2006.01) | |
| *H04L 27/28* | (2006.01) | |
| *H04L 1/02* | (2006.01) | |
| *H04B 7/04* | (2006.01) | |
| *H04B 7/06* | (2006.01) | |
| *H04L 27/00* | (2006.01) | |

(52) U.S. Cl.
CPC ............ *H04B 7/0413* (2013.01); *H04B 7/0671* (2013.01); *H04L 27/00* (2013.01)
USPC ........... 370/347; 370/206; 370/319; 375/260; 375/267

(58) Field of Classification Search
CPC .. H04B 7/0413; H04B 7/0671; H04B 7/0848; H04B 7/0608; H04L 1/06; H04L 5/0007; H04L 27/00; H04L 27/2647; H04L 27/2613; H04W 72/0453
USPC .......... 370/347, 206, 319, 320, 321; 375/260, 375/267
See application file for complete search history.

(56) References Cited

U.S. PATENT DOCUMENTS

| | | | | |
|---|---|---|---|---|
| 5,818,829 | A * | 10/1998 | Raith et al. ..................... | 370/347 |
| 2001/0004390 | A1* | 6/2001 | Pukkila et al. ................. | 375/340 |
| 2004/0120428 | A1* | 6/2004 | Maltsev et al. ................. | 375/341 |
| 2004/0190482 | A1* | 9/2004 | Baum et al. ..................... | 370/347 |
| 2005/0111528 | A1* | 5/2005 | Fulghum et al. ............... | 375/148 |

(Continued)

FOREIGN PATENT DOCUMENTS

| | | |
|---|---|---|
| JP | 2004-509556 | 3/2004 |
| JP | 2006-022170 | 1/2006 |
| WO | WO 2005/041441 A1 | 5/2005 |

OTHER PUBLICATIONS

Coleri, Sinem et al.: "Channel Estimation Techniques Based on Pilot Arrangement in OFDM Systems," IEEE Transactions on broadcasting, vol. 48, No. 3, pp. 223-229, Sep. 2002.

(Continued)

*Primary Examiner* — Nizar Sivji
(74) *Attorney, Agent, or Firm* — DC Patent Lawyers, PLLC (57) ABSTRACT

A plurality of antennas respectively conveys burst signals that use a plurality of subcarriers and contain control information for communications. When a plurality of subcarriers are used, a cyclic time shifting in a cycle in time domain is executed, per antenna, with a time-shift amount corresponding to each of the plurality of antennas. A control unit generates the burst signals informed from the plurality of antennas by complying with this rule. The control unit generates the burst signals by varying time shift amounts corresponding respectively to the plurality of antennas.

6 Claims, 7 Drawing Sheets

(56) References Cited

U.S. PATENT DOCUMENTS

| | | | |
|---|---|---|---|
| 2005/0259567 A1* | 11/2005 | Webster et al. | 370/208 |
| 2005/0281240 A1* | 12/2005 | Oh et al. | 370/343 |
| 2006/0013186 A1* | 1/2006 | Agrawal et al. | 370/344 |
| 2006/0286974 A1* | 12/2006 | Gore et al. | 455/422.1 |

OTHER PUBLICATIONS

Japanese Notification of Reason(s) for Rejection, w/ English translation thereof, issued in Japanese Patent Application No. JP 2006-022170 dated Mar. 1, 2011.

* cited by examiner

| L-STF | L-LTF | L-SIG | HT-SIG | HT-STF | HT-LTF | HT-DATA |
|---|---|---|---|---|---|---|
| L-STF + FIXED CDD | L-LTF + FIXED CDD | L-SIG + FIXED CDD | HT-SIG + FIXED CDD | HT-STF + VARIABLE CDD | HT-LTF + VARIABLE CDD | HT-DATA + VARIABLE CDD |

| L-STF | L-LTF | L-SIG | HT-SIG | HT-STF' | HT-LTF' | HT-LTF''' | HT-DATA' |
|---|---|---|---|---|---|---|---|
| L-STF + FIXED CDD | L-LTF + FIXED CDD | L-SIG + FIXED CDD | HT-SIG + FIXED CDD | HT-STF" + VARIABLE CDD | HT-LTF" + VARIABLE CDD | HT-LTF"" + VARIABLE CDD | HT-DATA" + VARIABLE CDD |

RADIO APPARATUS

CLAIM OF PRIORITY

This application claims priority to U.S. provisional patent application No. 60/694,987, filed on Jun. 30, 2005, which is incorporated herein by reference in its entirety.

BACKGROUND OF THE INVENTION

1. Field of the Invention

The present invention relates to radio apparatuses, and it particularly relates to a radio apparatus using multiple subcarriers.

2. Description of the Related Art

An OFF (Orthogonal Frequency Division Multiplexing) modulation scheme is one of multicarrier communication schemes that can realize the high-speed data transmission and are robust in the multipath environment. This OFF modulation scheme has been applied to the wireless standards such as IEEE802.11a/g and HIPERLAN/2. The burst signals in such a wireless LAN are generally transferred via a time-varying channel environment and are also subjected to the effect of frequency selective fading. Hence, a receiving apparatus generally carries out the channel estimation dynamically.

In order for the receiving apparatus to carry out the channel estimation, two kinds of known signals are provided within a burst signal. One is the known signal, provided for all carries in the beginning of the burst signal, which is the so-called preamble or training signal. The other one is the known signal, provided for part of carriers in the data area of the burst signal, which is the so-called pilot signal (See Reference (1) in the following Related Art List, for instance).

Related Art List (1) Sinem Coleri, Mustafa Ergen, Anuj Puri and Ahmad Bahai, "Channel Estimation Techniques Based on Pilot Arrangement in OFF Systems", *IEEE Transactions on broadcasting*, vol. 48, No. 3, pp. 223-229, September 2002.

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and a plurality of packet signals to be transmitted in parallel are set (hereinafter, each of a plurality of packets is called "stream" and the unit of a plurality of streams together or each thereof is called "packet signal"). That is, streams up to the maximum number of antennas are set for the communications between the transmitting apparatus and the receiving apparatus so as to improve the data transmission rates.

Moreover, combining this MIMO system with the OFF modulation scheme results in a higher data transmission rate. In such a MIMO system, the base station apparatus generally informs a terminal apparatus, wishing to have communications with said base station apparatus, of a signal that contains control information for communications (hereinafter, this signal will be referred to as "beacon"). Upon receipt of a beacon, the terminal apparatus requests the base station apparatus to start the communications, according to the contents of the beacon. In order to take the full advantage of the scheme of beacon messages in a MIMO system, the following are conditions required. The first requirement is that the beacon shall be transmitted from a plurality of streams to reduce transmission power per antenna. The second requirement is that the antenna directivity at the time of transmitting beacons shall be close to omnidirectivity in order for the beacon to be received by as many terminal apparatuses as possible. The third requirement is that the beacon can be received by a terminal apparatus which performs smoothing processing across subcarriers when channels are estimated to reduce the noise.

SUMMARY OF THE INVENTION

The present invention has been made in view of the foregoing circumstances and an object thereof is to provide a radio apparatus that transmits beacons suitable for multiple streams.

In order to solve the above problems, a radio apparatus according to a preferred embodiment of the present invention comprises: a plurality of antennas which respectively broadcasts burst signals that use a plurality of subcarriers and contain control information for communications; and a generation unit which generates the burst signals broadcasted from the plurality of antennas by complying with a rule wherein the rule is such that when a plurality of subcarriers are used, a cyclic time shifting in a cycle in time domain is executed, per antenna, with a time-shift amount corresponding to each of the plurality of antennas. The generation unit generates the burst signals by varying time shift amounts corresponding respectively to the plurality of antennas.

According to this embodiment, the burst signals are produced with a variety of time shift amounts, so that various required conditions can be met and accommodated.

The generation unit may generate the burst signal in a manner that a predetermined time-shift amount and a time shift amount longer than the predetermined time-shift amount are switched for each burst signal. In such a case, the time-shift amount is switched in units of bust signal, so that both the requirement for directivity and the requirement for correlation can be met.

The burst signal generated by the generation unit may contain a first part where time shifting is performed with a fixed time-shift amount, and contain a second part, placed posterior to said first part, where time shifting is performed by switching time shift amounts.

When the generation unit generates the burst signal with a predetermined time-shift amount, the generation unit may have information, indicating permission to perform a processing among the subcarriers at the time of receiving, contained in the first part where time shifting is performed with a fixed time-shift amount.

One example of "processings among subcarriers" is the smoothing of channel coefficients among subcarriers at the time when a channel characteristic is derived per subcarrier. For instance, if the channel coefficients derived in neighboring subcarriers are $h_{-1}$, $h_0$, $h_1$, $h_2$ and $h_3$, then an exemplary smoothing processing serves to reduce the effect of noise and is represented by $h_0'=(h_{-1}+2\times h_0+h_1)/4$, $h_1'=(h_0+2\times h_1+h_2)/4$ and the like.

When the generation unit generates a burst signal with the time-shift amount longer than the predetermined time-shift amount, the generation unit may have information, indicating to prohibit to perform a processing among the subcarriers at the time of receiving, contained in the first part where time shifting is performed with a fixed time-shift amount.

The generation unit may have information, indicative of permission or prohibition of smoothing processing, contained in a burst signal. In this case, the time shift amount can be varied and at the same time the permission or prohibition of smoothing processing can be indicated.

Data may be composed of a plurality of streams. A known signal may be composed of a plurality of streams. A control signal may be composed of a plurality of streams.

It is to be noted that any arbitrary combination of the above-described structural components and expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

Before describing the present invention in detail, an outline of the present invention will be described first. Embodiments according to the present invention relates to a MIMO system comprised of at least two radio apparatuses. One of the radio apparatuses corresponds to a base station apparatus and the other thereof corresponds to a terminal apparatus. The base station informs a beacon. At the time of transmitting the beacon, the beacon is sent from a plurality of antennas to reduce the transmitting power on each antenna. When the beacon is sent and broadcasted from a plurality of antennas, the interference among them needs to be reduced, and a means to solve this problem is to carry out CDD (Cyclic Delay Diversity). The CDD is a processing where in a predetermined interval a time-domain waveform is shifted, by a shift amount, in a posterior direction and then the waveform pushed out from the rearmost part in the predetermined interval is assigned cyclically in a header portion of the predetermined interval. When a beacon is transmitted and broadcasted from a plurality of antennas, different shift amounts are associated respectively to a plurality of antennas.

Under these circumstances, if the shift amount is small, signals transmitted from a plurality of antennas resemble one another. Hence, there are caused a direction in which the signals intensify one another and a direction in which the signals diminish one another. In other words, the effect of beamforming is produced. As a result, the antennas have directivities and the then a direction where no beacon can be reached may be caused. This violates the requirement for beacons that the beacons be received by as many terminal apparatuses as possible. If, on the other hand, the shift amount is large, the effect of beamforming is reduced. As a result thereof, the directivity of antennas becomes almost omnidirectional, which in turn satisfies the requirement for beacons that the beacons be received by as many terminal apparatuses as possible. However, since the fact that the shift amount is large is equivalent to the presence of delayed wave having longer delay time, the correlation among channel coefficients in subcarriers gets smaller. As a result, if a terminal apparatus, which is performing signal processing among subcarriers such as statistical processing or smoothing processing among subcarriers, receives beacons whose correlation among channel coefficients in subcarriers is small, error is likely to occur. In particular, a terminal apparatus, in which the function of smoothing processing cannot be turned off, cannot receive such beacons. The smoothing processing is performed generally for the purpose of reducing noise in channel estimation.

In order to solve such problems, a base station apparatus according to the present embodiment performs the following processing. The base station apparatus defines a first shift amount which is smaller and a second shift amount which is larger. The first shift amount and the second shift amount are defined as a group of shift amounts where the shift amounts for a plurality of antennas are combined. The first shift amount and the second shift amount may include the shift amount of "0".

Figure 1:
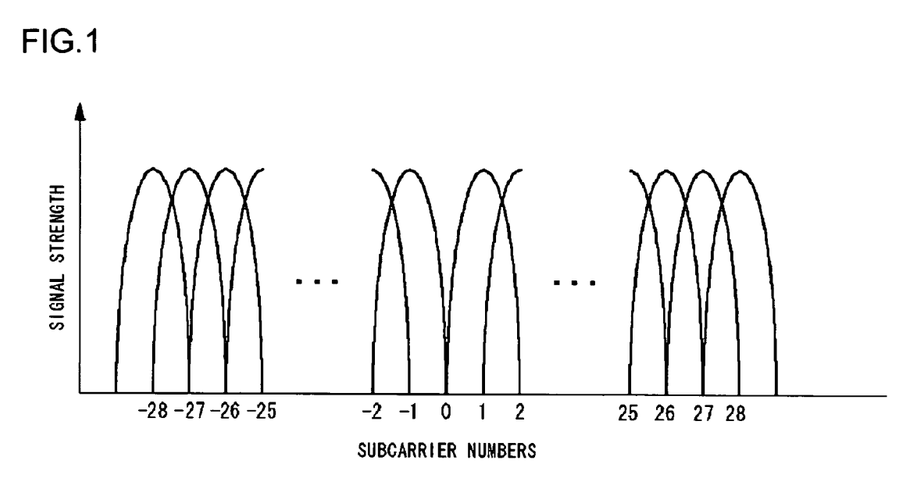
FIG. 1 illustrates a spectrum of a multicarrier signal according to an embodiment of the present invention.

FIG. 1 illustrates a spectrum of a multicarrier signal according to an embodiment of the present invention. In particular, FIG. 1 shows a spectrum of a signal in the OFF modulation scheme. One of a plurality of carriers in an OFF modulation scheme is generally called a subcarrier. Herein, however, a subcarrier is designated by a "subcarrier number". In a MIMO system, 56 subcarriers, namely, subcarrier numbers "−28" to "28" are defined herein. It is to be noted that the subcarrier number "0" is set to null so as to reduce the effect of a direct current component in a baseband signal. On the other hand, in a legacy system, 52 subcarriers, namely, subcarrier numbers "−26" to "26" are defined. One example of legacy systems is a wireless LAN complying with the IEEE802.11a standard.

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM.

Convolutional coding is applied, as an error correction scheme, to these signals. The coding rates for the convolutional coding are set to ½, ¾ and so forth. The number of data to be transmitted in parallel is set variably. The data are transmitted as burst signals and each of burst signals to be transmitted in parallel is called "stream" herein. As a result thereof, since the mode of modulation scheme and the values of coding rate and the number of streams are set variably, the data rate is also set variably. It is to be noted that the "data rates" may be determined by arbitrary combination of these factors or by one of them.

Figure 2:
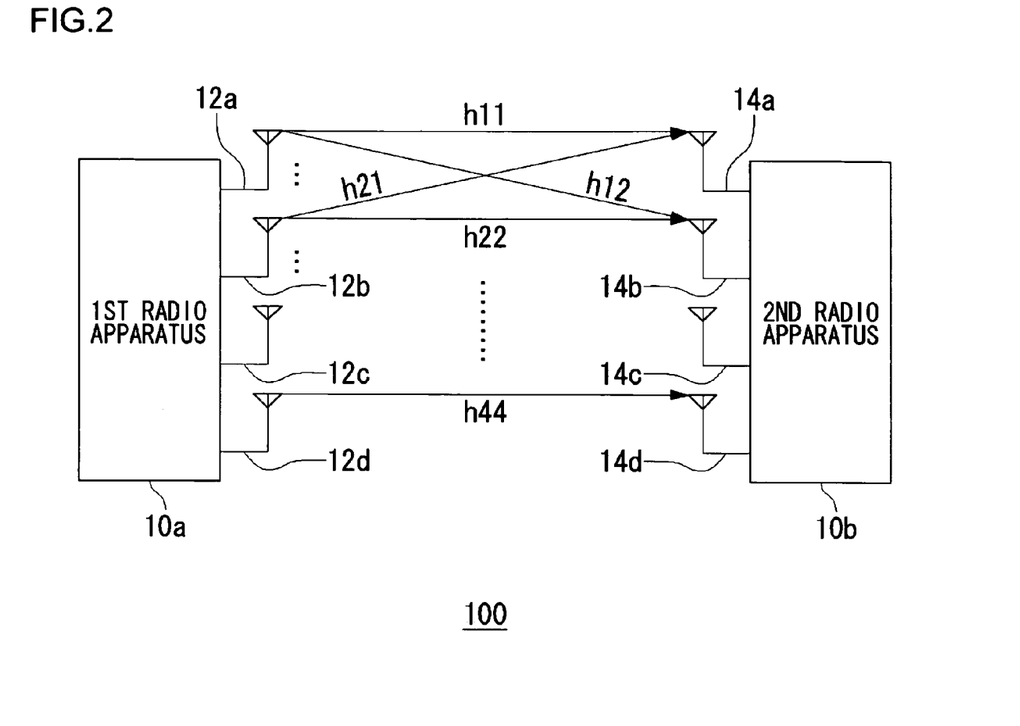
FIG. 2 illustrates a structure of a communication system according to an embodiment of the present invention.

FIG. 2 illustrates a structure of a communication system 100 according to an embodiment of the present invention. The communication system 100 includes a first radio apparatus 10a and a second radio apparatus 10b, which are generically referred to as "radio apparatus 10". The first radio apparatus 10a includes a first antenna 12a, a second antenna 12b, a third antenna 12c and a fourth antenna 12d, which are generically referred to as "antennas 12", and the second radio apparatus 10b includes a first antenna 14a, a second antenna 14b, a third antenna 14c and a fourth antenna 14d, which are generically referred to as "antennas 14". Here, the first radio apparatus 10a corresponds to a base station apparatus, whereas the second radio apparatus 10b corresponds to a terminal apparatus.

Before describing a structure of the communication system 100, an outline of a MIMO system will be explained first. Assume herein that data are being transmitted from the first radio apparatus 10a to the second radio apparatus 10b. The first radio apparatus 10a transmits respectively data of multiple streams from the first antenna 12a through the fourth antenna 12d, respectively. As a result, the data rate becomes higher. The second radio apparatus 10b receives the data of multiple streams by the first antenna 14a through the fourth antenna 14d. The second radio apparatus 10b separates the received signals by adaptive array signal processing and demodulates independently the data of multiple streams.

Since the number of antennas 12 is "4" and the number of antennas 14 is also "4" here, the number of combinations of channels between the antennas 12 and the antennas 14 is "16". The channel characteristic between from the ith antenna 12i to the jth antenna 14j is denoted by $h_{ij}$. In FIG. 2, the channel characteristic between the first antenna 12a and the first antenna 14a is denoted by $h_{11}$, that between the first antenna 12a and the second antenna 14b by $h_{12}$, that between the second antenna 12b and the first antenna 14a by $h_{21}$, that between the second antenna 12b and the second antenna 14b by $h_{22}$, and that between the fourth antenna 12d and the fourth antenna 14d by $h_{44}$. For the clarity of illustration, it is omitted to show the other channels in FIG. 2.

Figure 3A:
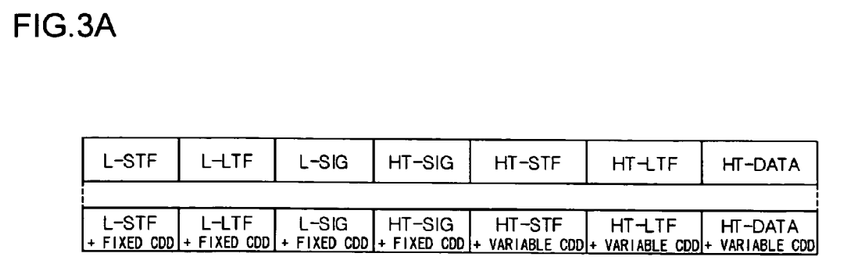
FIGS. 3A to 3C illustrate packet formats in the communication system shown in FIG. 2.
Figure 3B:
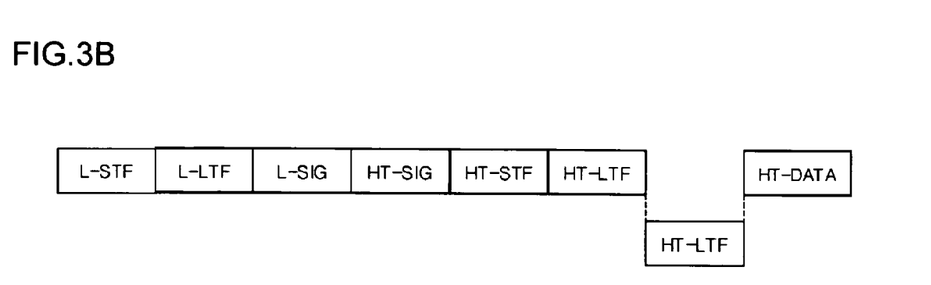
Figure 3C:
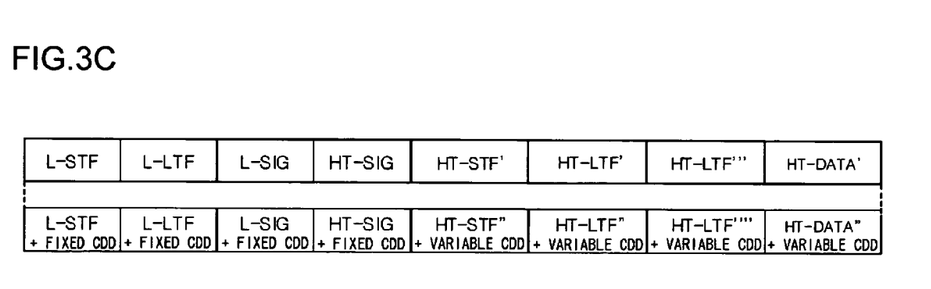

FIGS. 3A to 3C illustrate packet formats in a communication system 100. In particular, packet formats in the beacons will be described here. The beacon is a signal that a base station apparatus transmits, at predetermined intervals, to a terminal apparatus wishing to communicate with the base station apparatus. Generally, the beacon contains information on said base station. Packet formats for use with data in communications are formed in the similar manner but the description thereof is omitted here. FIG. 3A shows a packet format of beacon conveyed from the antennas 12. It is assumed herein that beacon is conveyed and informed from the first antenna 12a and the second antenna 12b.

The beacon conveyed from the first antenna 12a is shown in the top row, whereas the beacon conveyed from the second antenna 12b is shown in the bottom row. "L-STF", "L-LTF" and "L-SIG" in the top row correspond to a known signal for use in timing estimation and, a known signal for use in channel estimation and a control signal compatible with a legacy system, respectively. "HT-SIG", "HT-STF", "HT-LTF" and "HT-DATA" correspond to a control signal, a known signal for use in timing estimation, a known signal for use in channel estimation and data compatible with a MIMO system, respectively.

On the other hand, "L-STF+Fixed CDD", "L-LTF+Fixed CDD", "L-SIG+Fixed CDD" and "HT-SIG+Fixed CDD" in the bottom row correspond to the results in which CDD is performed, with a fixed shift amount, on "L-STF", "L-LTF", "L-SIG" and "HT-SIG", respectively. The fixed shift amounts are not necessarily the same value and they may differ from one another. "HT-STF+Variable CDD", "HT-LTF+Variable CDD" and "HT-DATA+Variable CDD" correspond to the results in which CDD is performed, with variable shift amounts, on "HT-STF", "HT-LTF" and "HT-DATA", respectively. The variable shift amounts are not necessarily the same value and they may differ from one another. For the simplicity of explanation, the fixed shift amount is the first shift amount here. As the variable shift amounts, the first shift amount and the second shift amount are selected alternately in units of packet. If beacon is informed from three or more antennas 12, the shift amounts are so defined that the shift amount for the second antenna 12b differs from that for the third antenna 12c. For instance, the shift amount for the second antenna 12b is defined to be 50 nsec and that for the third antenna 12c is 100 nsec.

FIG. 3B shows a packet format of beacon processed within the first radio apparatus 10a. The top row corresponds to first streams and the bottom row corresponds to a second stream. The top row of FIG. 3B is almost identical to the top row of FIG. 3A. The second stream has "HT-LTF" only. That is, in FIG. 3B, "HT-LTF" alone is assigned in a plurality of streams. FIG. 3C shows a packet format of beacon informed from the antennas 12 and is a packet format corresponding to FIG. 3B. "L-STF", "L-LTF", "L-SIG" and "HT-SIG" in the top row and "L-STF+Fixed CDD", "L-LTF+Fixed CDD", "L-SIG+Fixed CDD" and "HT-SIG+Fixed CDD" in the bottom row are the same as those of FIG. 3A.

"HT-STF'" in the top row and "HT-STF"+Variable CDD" in the bottom row of FIG. 3C correspond to the results in which an orthogonal matrix described later is multiplied to "HT-STF" and then CDD is performed thereon, respectively. That is, multiplying "HT-STF" by an orthogonal matrix produces "HT-STF'" and "HT-STF""" and then CDD is performed with a variable shift amount in the bottom row. The same applies to "HT-LTF""" and "HT-DATA'" in the top row and "HT-LTF"""+ Variable CDD" and "HT-DATA"+Variable CDD" in the bottom row.

Figure 4:
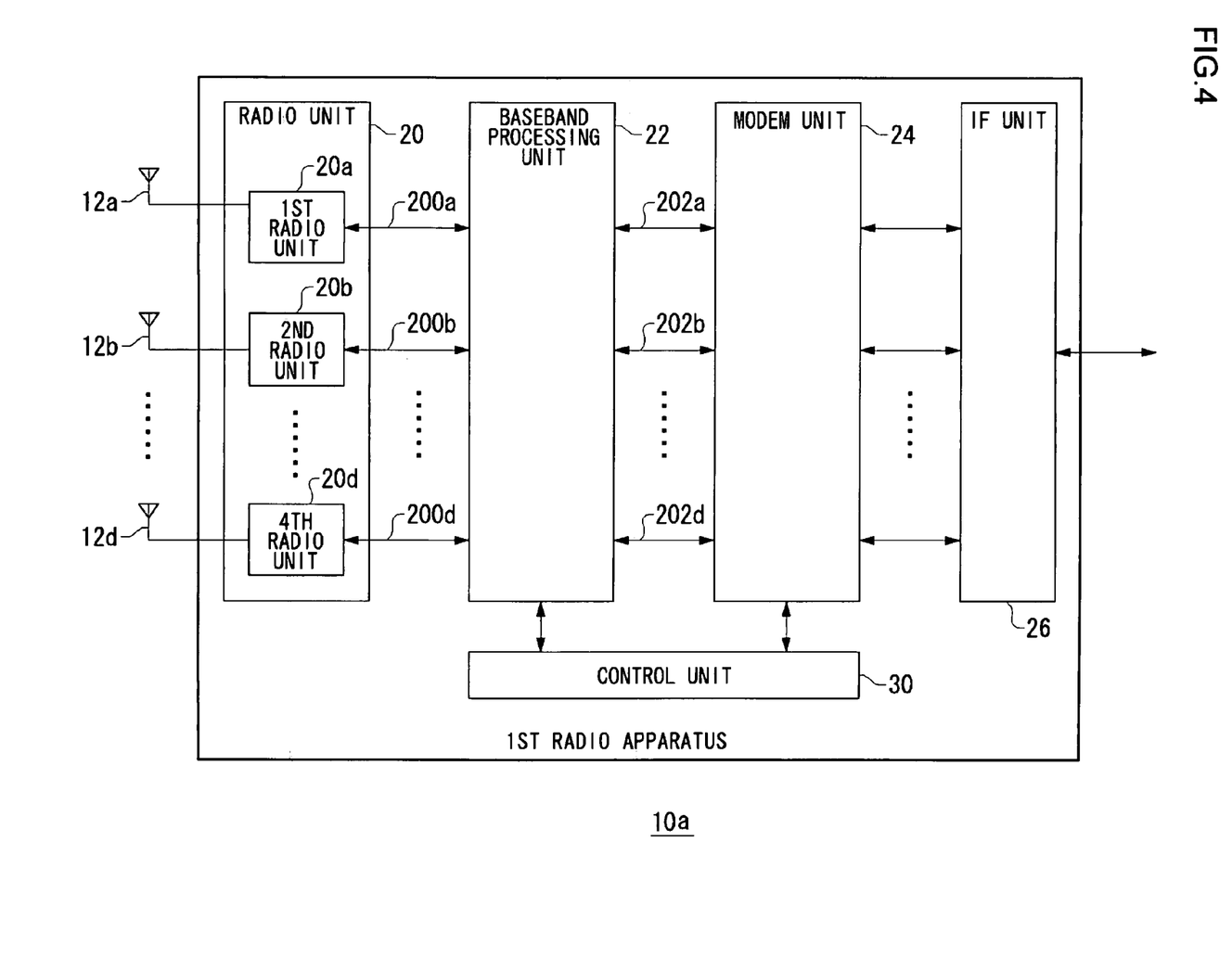
FIG. 4 illustrates a structure of a first radio apparatus shown in FIG. 2.

FIG. 4 illustrates a structure of a first radio apparatus 10a. The first radio apparatus 10a includes a first radio unit 20a, a second radio unit 20b, . . . and a fourth radio unit 20d, which are generically referred to as "radio unit 20", a baseband processing unit 22, a modem unit 24, an IF unit 26 and a control unit 30. Signals involved include a first time-domain signal 200a, a second time-domain signal 200b, . . . and a fourth time-domain signal 200d, which are generically referred to as "time-domain signal 200", and a first frequency-domain signal 202a, a second frequency-domain signal 202b, a third frequency-domain signal 202c and a fourth frequency-domain signal 202d, which are generically referred to as "frequency-domain signal 202". It is to be noted that the second radio apparatus 10b is so structured as to correspond to the first radio apparatus 10a.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is expressed here by a single signal line only. An AGC (Automatic Gain Control) unit and an A-D conversion unit are also included. As a transmission operation, the radio unit 20 carries out frequency conversion of baseband signals from the baseband processing unit 22 so as to derive radiofrequency signals.

Here, the baseband signal from the baseband processing unit 22 is also indicated as the time-domain signal 200. The radio unit 20 outputs the radiofrequency signals to the antennas 12. A PA (power amplifier) and a D-A conversion unit are also included in the first radio apparatus 10a. It is assumed herein that the time-domain signal 200 is a multicarrier signal converted to the time domain and is a digital signal. In particular, the radio unit 20 broadcasts respectively, from a plurality of antennas 12, beacons which use a plurality of subcarriers and have the packet format as shown in FIG. 3C.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. One frequency-domain signal 202 corresponds to data contained respectively in a plurality of streams transmitted from the second radio apparatus 10b, not shown here. As a transmission operation, the baseband processing unit 22 inputs, from the modem unit 24, the frequency-domain signals 202 serving as signals in the frequency domain, converts the frequency-domain signals into time domain and then outputs the thus converted signals as time-domain signals by associating them respectively with a plurality of antennas 12.

Assume that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 5:
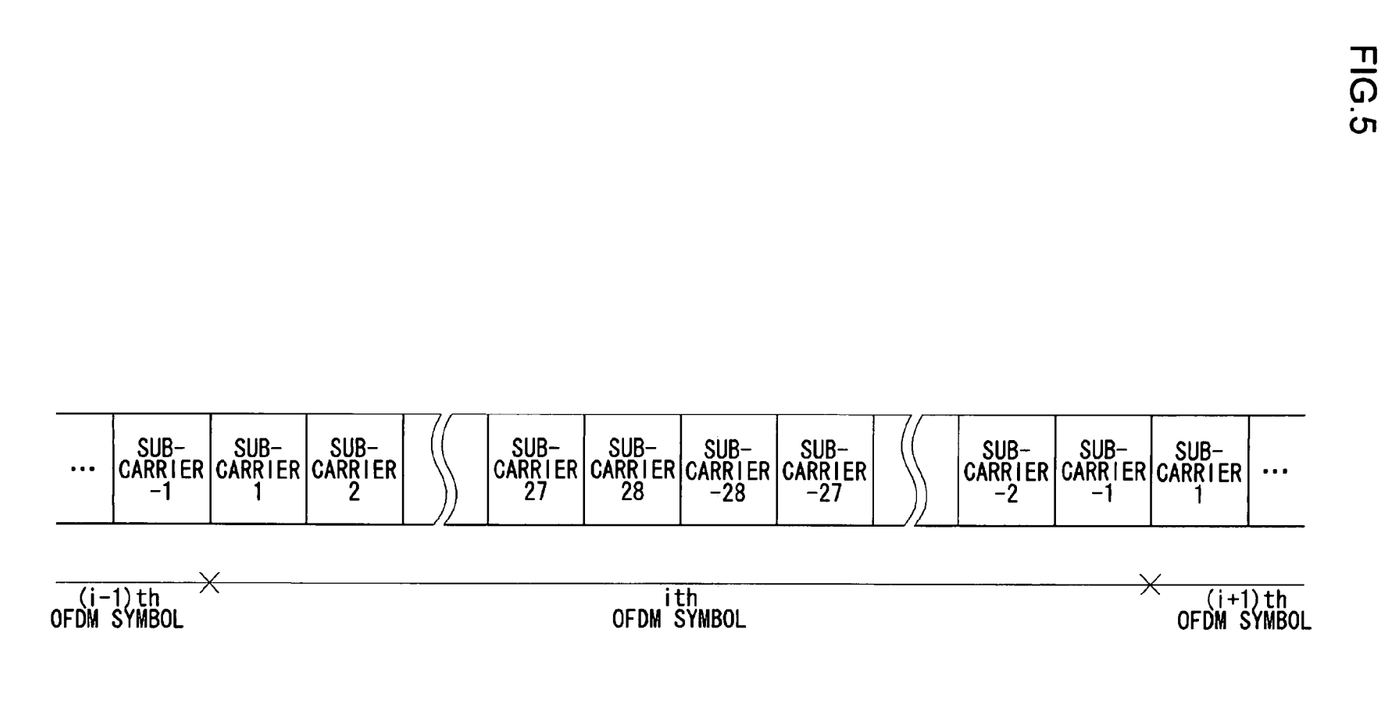
FIG. 5 illustrates a structure of a frequency-domain signal shown in FIG. 4.

FIG. 5 illustrates a structure of a frequency-domain signal. Assume herein that a combination of subcarrier numbers "−28" to "28" shown in FIG. 1 constitutes an "OFF symbol". An "i"th OFF symbol is such that subcarrier components are arranged in the order of subcarrier numbers "1" to "28" and subcarrier numbers "−28" to "−1". Assume also that an "(i−1)"th OFF symbol is placed before the "i"th OFF symbol, and an "(i+1)"th OFF symbol is placed after the "i"th OFF symbol.

Now refer back to FIG. 4. The baseband processing unit 22 performs CDD to generate beacons. If a packet format as shown in FIG. 3B is inputted, the multiplication by an orthogonal matrix is also carried out. The latter case will be explained first here. A beacon having a packet format as shown in FIG. 3B is inputted to the baseband processing unit 22. The baseband processing unit 22 multiplies "HT-STF", "HT-LTF" and "HT-DATA" respectively by a steering matrix. Before performing the multiplication, the baseband processing unit 22 extends the degree of inputted data to the number of multiple streams.

The number of data is "1" and is represented here by "Nin". Hence, the inputted data is expressed by a vector "Nin×1". The number of multiple streams is "2" and is represented here by "Nout". The baseband processing unit 22 extends the degree of inputted data from Nin to Nout. That is, a vector "Nin×1" is extended to a vector "Nout×1". In so doing, "0's" are inserted to components of from (Nin+1)th row to Nout-th row. The same processing is performed on "HT-LTF" in the second stream.

A steering matrix S is expressed by the following Equation (1).

$$S(\lambda) = C(\lambda)W \quad (1)$$

The steering matrix is a matrix of "Nout×Nout". W is an orthogonal matrix and is a matrix of "Nout×Nout". One example of orthogonal matrices is Walsh matrix. Here, "λ" indicates the subcarrier number, and the multiplication by the steering matrix is carried out for each subcarrier. C is expressed by the following Equation (2).

$$C(\lambda) = \mathrm{diag}(1, \exp(-j2\pi\lambda\delta/Nout), \Lambda, \exp(-j2\pi\lambda\delta(Nout-1)/Nout)) \quad (2)$$

where δ indicates a shift amount. That is, the baseband processing unit 22 performs time shifting within HT-STF which has been increased up to the number of multiple streams, on each stream, with a shift amount corresponding to each of the multiple streams. The shift amount is set to different values for each stream. In so doing, the shift amount is switched to either the first shift amount or the second shift amount, as described earlier. In the case of "L-STF" or the like as in FIG. 3A, the processing pertaining to CDD in the above description is performed thereon.

As a receiving processing, the modem unit 24 demodulates and decodes the frequency-domain signal 202 outputted from the baseband processing unit 22. The demodulation and decoding are carried out per subcarrier. The modem unit 24 outputs the decoded signal to the IF unit 26. As a transmission processing, the modem unit 24 carries out coding and modulation. The modem unit 24 outputs the modulated signal to the baseband processing unit 22 as a frequency-domain signal 202. When the transmission processing is carried out, the modulation scheme and coding rate are specified by the control unit 30.

As a receiving processing, the IF unit 26 combines signals outputted from a plurality of modem units 24 and then forms one data stream. The IF unit 26 outputs the data stream. As a transmission processing, the IF unit 26 inputs one data stream and then separates it. Then the IF unit 26 outputs the thus separated data to the plurality of modem units 24.

The control unit 30 controls the timing and the like of the first radio apparatus 10a. The control unit 30 also carries out a control related to the generation of beacons. That is, as described earlier, the CDD within a cycle in the time domain using a plurality of subcarriers is defined, for each antenna 12, by the shift amount corresponding respectively to a plurality of antennas 12. "A cycle in the time domain using a plurality of subcarriers" is understood to be a period defined based on an IFFT period and a guard interval period. While complying with the periods defined accordingly, the baseband processing unit 22 produces beacons to be conveyed from a plurality of antennas 12. Then the control unit 30 has the baseband processing unit 22 produce beacons by varying the shift amounts that corresponds respectively to a plurality of antennas 12.

Portions in which the shift amount is varied in the packet format are those indicated with "Variable CDD" in FIGS. 3A and 3C. The change of shift amount is realized by switching between the first shift amount and the second shift amount. For instance, if "a cycle in the time domain using a plurality of subcarriers" is 3200 nsec, the first shift amount is defined to be 50 nsec and the second shift amount is defined to be 400 nsec. The control unit 30 so controls that a first part in which CDD is performed with a fixed shift amount is inserted and contained in the packet signal as shown in FIGS. 3A and 3C and a second part in which CDD is performed by switching the shift amounts is inserted and contained in a position posterior to the first part.

In a case when the first shift amount is used, the control unit 30 so controls that information, which indicates permission to perform a smoothing processing of channel coefficients across subcarriers when the channel coefficients are derived for each subcarrier at the time of receiving, is inserted in L-SIG or HT-SIG. In other words, the control unit 30 permits a radio apparatus 10 that should receive a beacon, for example, the second radio apparatus 10b, to perform smoothing processing of channel coefficients across subcarriers on the received beacon. On the other hand, in a case when the second shift amount is used, the control unit 30 so controls that information, which indicates to prohibit to perform a smoothing processing of channel coefficients across subcarriers when the channel coefficients are derived for each subcarrier at the time of receiving, is inserted in L-SIG or HT-SIG. In other words, the control unit 30 prohibits a radio apparatus 10 that should receive a beacon, for example, the second radio apparatus 10b, from performing smoothing processing of channel coefficients across subcarriers on the received beacon.

In terms of hardware, this structure can be realized by a CPU, a memory and other LSIs of an arbitrary computer. In terms of software, it is realized by memory-loaded programs which have communication functions and the like, but drawn and described herein are function blocks that are realized in cooperation with those. Thus, it is understood by those skilled in the art that these function blocks can be realized in a variety of forms such as by hardware only, software only or the combination thereof.

Figure 6:
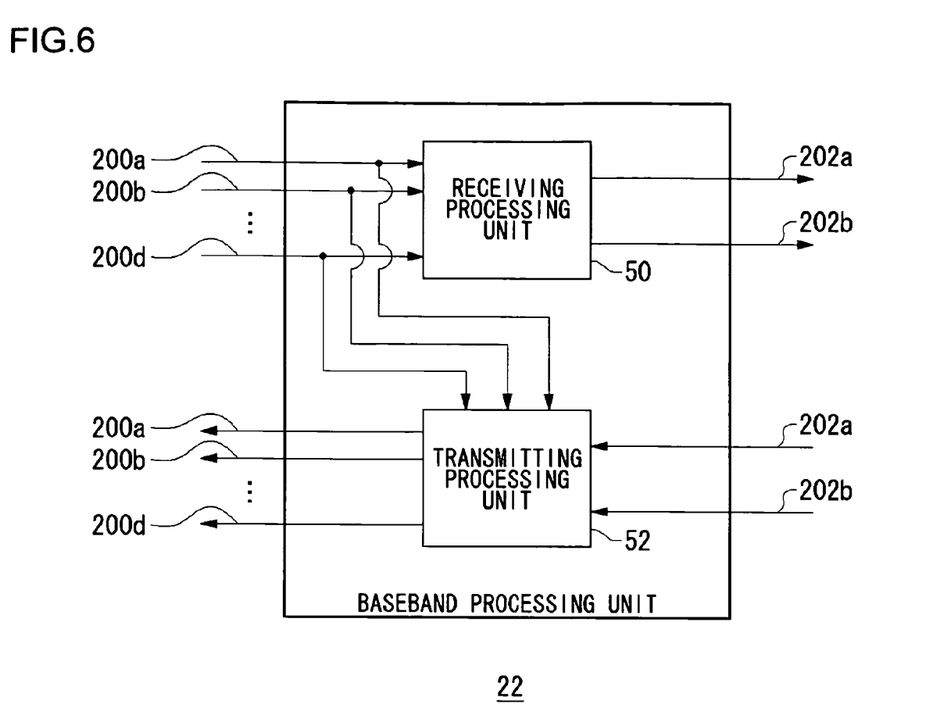
FIG. 6 illustrates a structure of a baseband processing unit shown in FIG. 4.

FIG. 6 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and, for this purpose, executes the derivation of receiving weight vectors. Then the receiving processing unit 50 outputs the result of array synthesis as the frequency-domain signal 202.

A processing of receiving processing unit 50 will now be described in a specific manner. The receiving processing unit 50 inputs a plurality of time-domain signals 200 and then performs Fourier transform on them, respectively, so as to derive frequency-domain signals. As described earlier, a frequency-domain signal is such that signals corresponding to subcarriers are arranged serially in the order of subcarrier numbers.

The receiving processing unit 50 weights the frequency-domain signals with receiving weight vectors, and a plurality of weighted signals are added up. Since the frequency-domain signal is composed of a plurality of subcarriers, the above processing is also executed on a subcarrier-by-subcarrier basis. As a result, the signals summed up are also arranged serially, as shown in FIG. 5, in the order of subcarrier numbers. The signals summed up are the aforementioned frequency-domain signals 202.

The receiving processing unit 50 derives receiving weight vectors by use of an adaptive algorithm, for example, LMS algorithm. Alternatively, receiving response vectors are derived by correlation processing and then the receiving weight vectors may be derived from the receiving response vectors. Here, the latter case will be described. If a frequency-domain signal corresponding to the first time-domain signal 200a is denoted by $x_1(t)$, a frequency-domain signal corresponding to the second time-domain signal 200b by $x_2(t)$, a reference signal in the first stream by $S_1(t)$ and a reference signal in the second stream by $S_2(t)$, then $x_1(t)$ and $X_2(t)$ will be expressed by the following Equation (3):

$$x_1(t) = h_{11} S_1(t) + h_{21} S_2(t)$$

$$x_2(t) = h_{12} S_1(t) + h_{22} S_2(t) \tag{3}$$

The noise is ignored here. A first correlation matrix $R_1$, with E as an ensemble average, is expressed by the following Equation (4):

$$R_1 = \begin{bmatrix} E[x_1 S_1^*] & E[x_1 S_2^*] \\ E[x_2 S_1^*] & E[x_2 S_2^*] \end{bmatrix} \tag{4}$$

A second correlation matrix $R_2$ among the reference signals is given by the following Equation (5).

$$R_2 = \begin{bmatrix} E[S_1 S_1^*] & E[S_1 S_2^*] \\ E[S_2 S_1^*] & E[S_2 S_2^*] \end{bmatrix} \tag{5}$$

Finally, the first correlation matrix $R_1$ is multiplied by the inverse matrix of the second correlation matrix $R_2$ so as to derive a receiving response vector, which is expressed by the following Equation (6).

$$\begin{bmatrix} h_{11} & h_{21} \\ h_{12} & h_{22} \end{bmatrix} = R_1 R_2^{-1} \tag{6}$$

Then the receiving processing unit 50 computes a receiving weight vector from the receiving response vector.

The transmitting processing unit 52 executes a part, corresponding to a transmission operation, of operations by the baseband processing unit 22. That is, the transmitting processing unit 52 performs CDD and multiplication by an orthogonal matrix.

Figure 7:
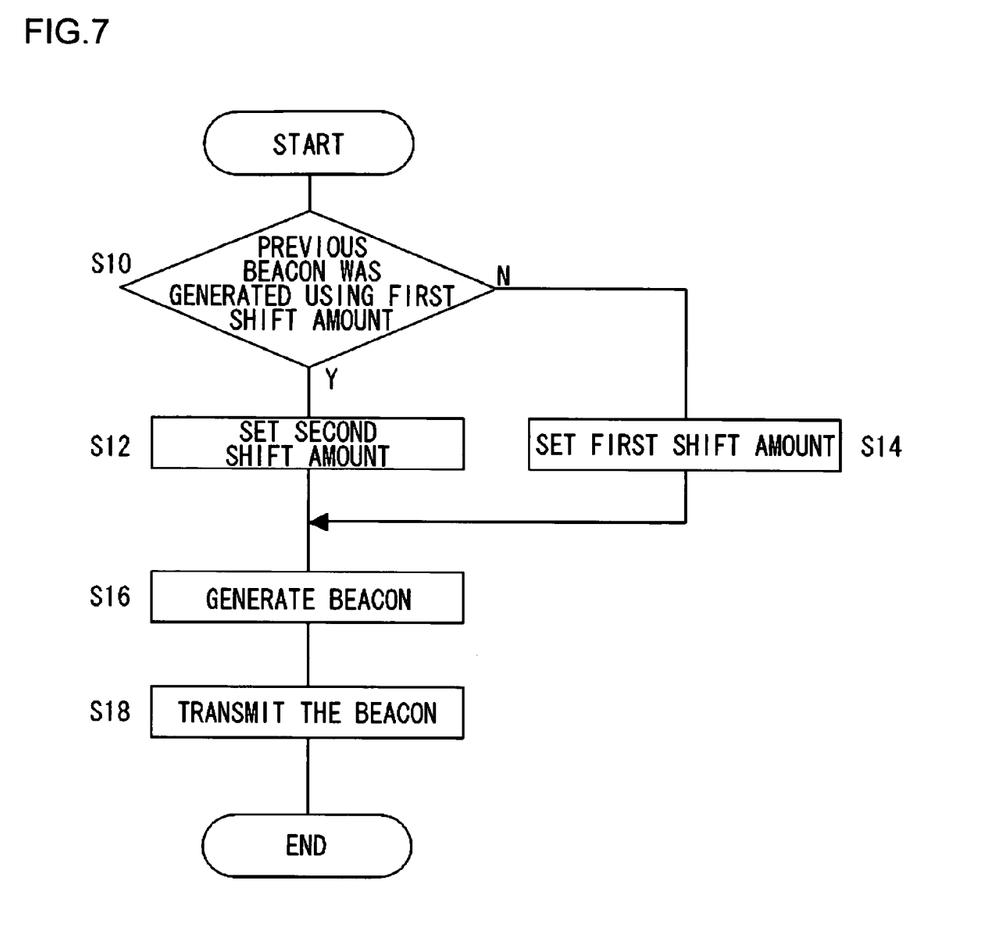
FIG. 7 is a flowchart showing a procedure for generating beacons by the first radio apparatus of FIG. 4.

FIG. 7 is a flowchart showing a procedure for generating beacons by a first radio apparatus 10a. If the beacon previously generated is generated using the first shift amount (Y of S10), the control unit 30 sets the second shift amount (S12). If, on the other hand, the previous beacon is not generated with the first shift amount (N of S10), the control unit 30 sets the first shift amount (S14). Under such setting, the control unit 30 together with the baseband processing unit 22 generate beacons (S16). The baseband processing unit 22 and the radio unit 20 generate beacons (S18).

According to the present embodiment of the present invention, CDD is performed when the beacon is broadcasted from a plurality of antennas, so that the interference among beacons can be reduced. When CDD is performed, the shift amount is varied. Thus, both the requirement condition for antenna directivity and the requirement condition for correlation among subcarriers can be satisfied. CDD is performed in a manner that the first shift amount and the second shift amount are switched. Thus, the correlation of channel coefficients among subcarriers can be made larger when the first shift amount is implemented, whereas the antenna directivity can be made close to omnidirectivity when the second shift amount is implemented. Since there is available the timing with which the antenna directivity can be made closer to omnidirectivity, a structure is such that the beacon generated as a result of CDD with the second shift amount can be received by a terminal apparatus which cannot receive beacons generated as a result of CDD with the first shift amount.

Furthermore, since there is available the timing with which to enlarge the correlation among subcarriers, a structure is such that the beacon generated as a result of CDD with the first shift amount can be received by a terminal apparatus which cannot receive beacons generated as a result of CDD with the second shift amount and also cannot turn off the function of smoothing processing. Since information, by which the smoothing processing is permitted when the beacon is produced by CDD with the first amount, is contained, the smoothing processing can be carried out when a terminal apparatus derives channel coefficients. Since the smoothing processing can be carried out, the effect of noise can be reduced. Since information, by which the smoothing processing is prohibited when the beacon is produced by CDD based on the second shift amount, is contained, a terminal apparatus which cannot turn off the function of smoothing processing can stop the receiving processing. By stopping the receiving processing, the power consumed by the terminal apparatus can be reduced.

The present invention has been described based on the embodiments which are only exemplary. It is therefore understood by those skilled in the art that other various modifications to the combination of each component and process are possible and that such modifications are also within the scope of the present invention.

According to the present embodiments of the present invention, the control unit 30 selects, as the shift amount, either the first shift amount or the second shift amount. That is, two stages of shift amounts are defined in accordance with the magnitude of shifting. However, the structure is not limited thereto and, for example, more than two stages of shift amounts may be defined. According to this modification, the shift amount can be controlled in a detailed manner. That is, it suffices as long as the shift amount includes a shift amount having a large shift value or values and a shift amount having a small shift value or values.

According to the present embodiments of the present invention, the radio apparatus 10 transmits beacons in a manner that the beacons are controlled by varying the shift amount of packet format shown in FIG. 3A or they are controlled by varying the shift amount of packet format shown in FIG. 3C. However, the arrangement is not limited thereto and, for example, the packet format shown in FIG. 3A may be used in the case of the first shift amount whereas the packet format shown in FIG. 3C may be used in the case of the second shift amount. In such an arrangement, information that indicates which packet format is being used may be contained in HT-SIG. In this case, the packet format of beacons can be defined in a multifarious manner. That is, it suffices as long as the shift amount includes a shift amount having a large shift value or values and a shift amount having a small shift value or values.

While the preferred embodiments of the present invention have been described using specific terms, such description is for illustrative purposes only, and it is to be understood that changes and variations may be made without departing from the spirit or scope of the appended claims.

What is claimed is:

1. A transmitting apparatus comprising:
a generation unit configured to generate a packet signal including a plurality of CDD (Cyclic Delay Diversity)-applied streams; and
a radio unit configured to send the packet signal from a plurality of antennas, wherein
the generation unit includes in the packet signal, information permitting a receiving apparatus to perform a smoothing process of channel coefficients across sub-carries when an amount of shift for CDD for the packet signal to be sent from the plurality of antennas becomes smaller than a threshold value defined for time, otherwise prohibiting the receiving apparatus to perform the smoothing process,
wherein the generation unit generates a packet signal in which a legacy short training field (L-STF), a legacy long training field (L-LTF), a legacy signal field L-SIG), a high throughput signal field (HT-SIG), a high throughput short training field (HT-STF), multiple high throughput long training fields (HT-LTF), and data are assigned in the stated order and the information is included in the high throughput short training field (HT-SIG).

2. The transmitting apparatus according to claim 1, further comprising a transmission unit configured to transmit the packet signal generated in the generation unit from a plurality of antennas.

3. A transmitting apparatus comprising:
a generation unit configured to generate a packet signal including a plurality of streams, each stream being subject to a cyclic time shift amount,
a radio unit configured to send the packet signal from a plurality of antennas,
wherein the packet signal includes information indicative of execution of smoothing process of channel coefficients across sub-carriers at the time of receiving,
wherein said information is indicative of permission of execution when an amount of shift for Cyclic Delay Diversity (CDD) introduced by said generation unit is shorter than a predetermined time amount,
wherein said information is indicative of non-execution when the amount of shift for CDD introduced by said generation unit is longer than said predetermined time amount, and
wherein the generation unit generates a packet signal in which a legacy short training field (L-STF), a legacy long training field (L-LTF), a legacy signal field (L-SIG), a high throughput signal field (HT-SIG), a high throughput short training field (HT-STF), multiple high throughput long training fields (HT-LTF), and data are assigned in the stated order and the information is included in the high throughput short training field (HT-SIG).

4. The transmitting apparatus according to claim 3, further comprising a transmission unit configured to transmit the packet signal generated in the generation unit from a plurality of antennas.

5. A receiving apparatus comprising:
a radio unit configured to receive a packet signal including a plurality of streams, each stream being subject to a cyclic time shift amount, wherein the packet signal includes information indicative of execution of smoothing process of channel coefficients across sub-carriers at the time of receiving,
a processing unit configured to determine, as a function of said information included in said packet signal, whether to carry out or not to carry out the smoothing process of channel coefficients across sub-carriers,
wherein said information is created by a transmitting apparatus that sent the packet signal, and
wherein the generation unit generates a packet signal in which a legacy short training field (L-STF), a legacy long training field (L-LTF), a legacy signal field (L-SIG), a high throughput signal field (HT-SIG), a high throughput short training field (HT-STF), multiple high throughput long training fields (HT-LTF), and data are assigned in the stated order and the information is included in the high throughput short training field (HT-SIG).

6. The receiving apparatus according to claim 5, wherein said packet signal is transmitted from a plurality of antennas.

* * * * *